United States Patent [19]

Chanel et al.

[11] 3,847,755

[45] Nov. 12, 1974

[54] SEPARATION OF DICHLOROBENZENE ISOMERS BY EXTRACTIVE DISTILLATION WITH AN APROTIC POLAR SOLVENT

[75] Inventors: René Chanel, Pont De Claix; Bernard Alexandre, Claix; Jean-Claude Leroi, Villeurbanne; Jacques Billion, Miribel, all of France

[73] Assignee: Rhone-Progil, Paris, France

[22] Filed: June 4, 1973

[21] Appl. No.: 367,009

[30] Foreign Application Priority Data

June 30, 1972 France .............................. 72.24576

[52] U.S. Cl. .................... 203/57, 203/58, 203/59, 203/60, 203/78, 203/80, 260/650 R
[51] Int. Cl. ......................... C07c 25/08, B01d 3/40
[58] Field of Search ............. 260/650 R; 203/57, 58, 203/60, 59, 91, 78, 80

[56] References Cited
UNITED STATES PATENTS

| | | | |
|---|---|---|---|
| 3,213,155 | 10/1965 | Schriescheim et al. | 260/638 R |
| 3,217,050 | 11/1965 | Schriescheim et al. | 260/638 R |
| 2,958,708 | 11/1960 | Fleck et al. | 260/650 R |
| 3,226,447 | 12/1965 | Bing et al. | 260/650 R |
| 3,170,961 | 2/1965 | Britton et al. | 260/650 R |
| 2,527,606 | 10/1950 | Webb | 260/650 R |
| 2,123,857 | 7/1938 | Wibaut et al. | 260/650 R |

Primary Examiner—Wilbur L. Bascomb, Jr.
Attorney, Agent, or Firm—Browdy and Neimark

[57] ABSTRACT

A method of separating mixtures of meta- and paradichlorobenzens by extractive distillation with aprotic polar solvents to isolate the metadichlorobenzene and then separating the paradichlorobenzene from the aprotic polar solvent by distillation.

8 Claims, 1 Drawing Figure

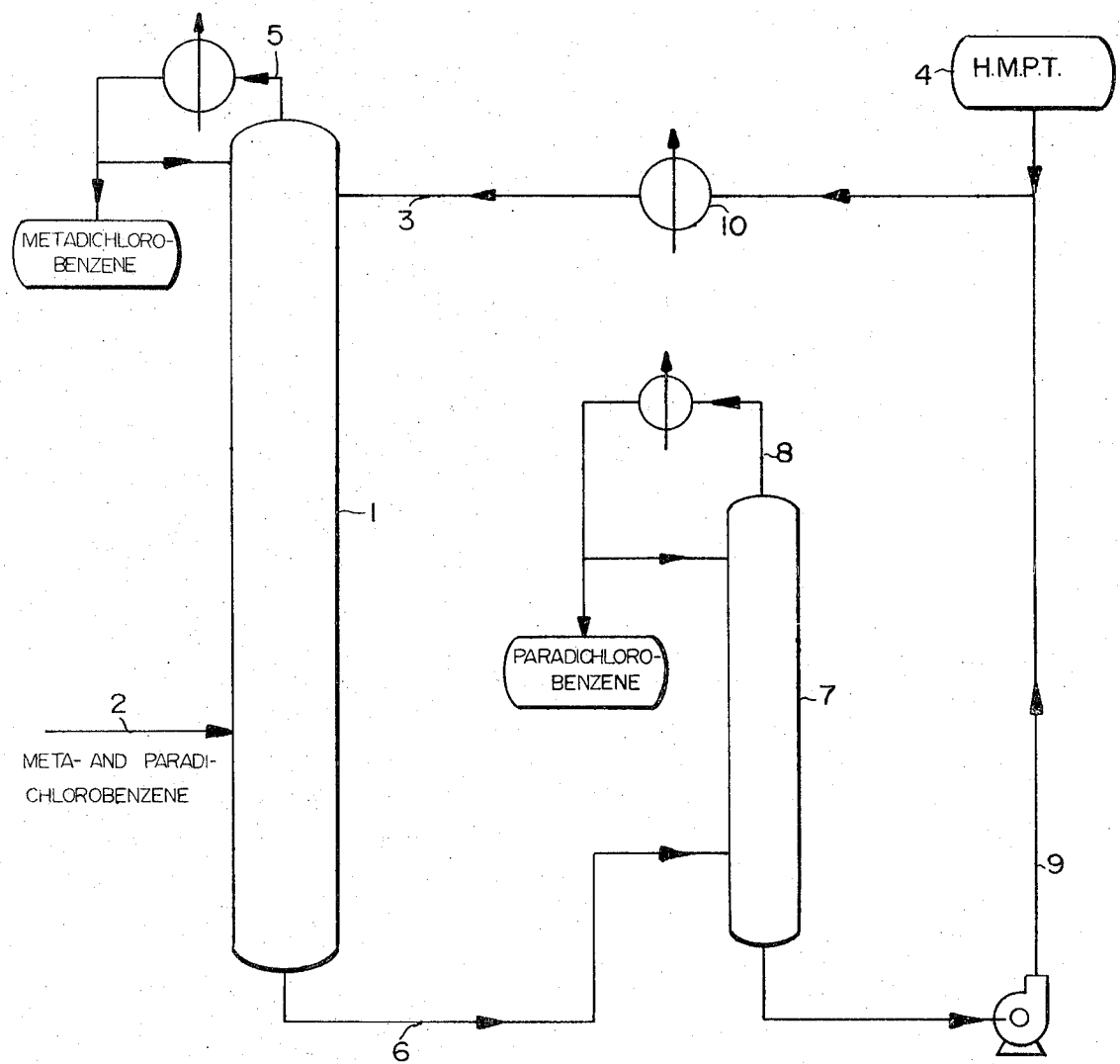

SEPARATION OF DICHLOROBENZENE ISOMERS BY EXTRACTIVE DISTILLATION WITH AN APROTIC POLAR SOLVENT

FIELD OF THE INVENTION

The present invention relates to a process for the separation of the isomers 1,3 and 1,4 of dichlorobenzene by extractive distillation with aprotic polar solvents.

BACKGROUND OF THE INVENTION

It is known that all of the processes for the synthesis of dichlorobenzene by chlorinating benzene lead to mixtures in various ratios of the three isomers of dichlorobenzene. These mixtures also contain small quantities of compounds which contain more or less than 2 atoms of chlorine on a benzene nucleus, their removal from the mixture of dichlorobenzenes of which do not pose a problem on account of their physical characteristics being distinctly different. On the other hand, the separation of each of the isomers of the dichlorobenzene is more difficult. Yet, the major part of orthodichlorobenzene is generally rather easily isolated by distillation, on account of its boiling point which is higher than those of the meta- and para-isomers, particularly under a reduced pressure. Then there is obtained a mixture of meta- and para-dichlorobenzenes, which generally contains at most 30% of the ortho isomer, and a few thousandths of mono- and tri-chlorobenzenes.

Pure metadichlorobenzene is not easily obtained from the above-mentioned mixture. Indeed, simple distillation is practically ineffective, because of the closeness of the boiling points of the meta- and para-isomers. In addition, the methods of crystallization only lead to an eutectic meta- para-containing 88% (in moles) of meta when the molar concentration in meta in the meta- para mixture is lower than 0.88. A method of separation has been described, which consists in brominating the dichlorobenzene, separating by distillation the brominated isomers, then in debrominating them so as to obtain the initial dichlorobenzenes (U.S. Pat. No. 3,170,961). It is obvious that this method is a complex and expensive one, and solves very uncompletely the problem of separation of the isomers of dichlorobenzene. The techniques of using molecular sieves (U.S. Pat. No. 2,958,708) are also only slightly satisfactory on account of the difficulties in regenerating the said sieves, and on account of their high price.

SUMMARY OF THE INVENTION

Applicants have perfected an easy method for the separation of meta- and para-dichlorobenzenes, which permits obtaining these compounds with a purity greater than 90%, and to solve an important technical problem, through the growing demand for pure metadichlorobenzene.

BRIEF DESCRIPTION OF THE DRAWINGS

The single FIGURE of the drawing illustrates a flow sheet of an example of the process of the present invention.

DESCRIPTION OF THE PREFERRED EMBODIMENTS

The present invention relates to a process for the separation of meta- and para-dichlorobenzenes, characterized in that the metadichlorobenzene is isolated from a mixture containing the two isomers, by an extractive distillation in the presence of at least one aprotic polar solvent, then the paradichlorobenzene is separated from the aprotic polar solvent by distillation.

It should be noted that the selection of the class of extractive solvents is quite unobvious. Indeed, it is always very difficult to foresee which compounds would modify the relative volatility of isomers sufficiently to make a separation by extractive distillation possible. The physical interactions and the chemical effects between the solvent and the isomers are phenomena which are still not known, and the man skilled in the art has no precise rule which allows him to make a selection a priori. It was therefore surprising to applicants to note that the aprotic polar solvents are particularly suitable for the separation of meta- and para-dichlorobenzenes by extractive distillation.

The mixture of the meta- and para-isomers of dichlorobenzene can consist of only these two products. However, the mixture generally contains other chlorinated benzene compounds in a ratio, however, not higher than 30% by weight of the mixture. These compounds are generally monochlorobenzene, ortho dichlorobenzene and trichlorobenzenes synthetized during the fabrication of dichlorobenzene. Generally, the mono- and tri-chlorobenzenes are present in a small quantity, for instance lower than 0.5%.

The aprotic polar solvents are chosen from among the organic solvents the dielectric constant of which is higher than 20, and the dipolar moment higher than 3.0 Debye. The utilization of one solvent is generally easier, however, a mixture of solvents can be used to carry out the distillation.

Among the compounds complying with the required conditions, particularly suitable are those listed in the following table, which also lists the values of the coefficient of relative volatility measured during the tests carried on by applicants with an Hala ebulliometer, under a pressure of 50 mm of mercury, the molar ratio solvent/dichlorobenzenes being equal to 0.85.

| Aprotic polar solvent | Coefficient of relative viscosity of meta- and para-dichlorobenzenes. |
|---|---|
| Hexamethylphosphorotriamide | 1.20 |
| Dimethylsulfoxide | 1.175 |
| N-methyl pyrrolidone | 1.16 |
| Dibutylsulfoxide | 1.15 |

As above described, the process according to the invention includes a step for the separation of metadichlorobenzene, then a step for the separation of the extracting solvent and the paradichlorobenzene.

The first step is generally carried out under the following conditions.

The relative proportions of dichlorobenzenes and of aprotic polar solvent in the distillating column depend upon the nature of the solvent and the desired efficiency. In general, it can be said that the coefficient of relative volatility of the mixture of isomers increases with the proportion of solvent, and that the capacity of distillation decreases when the proportion of solvent increases, all the other conditions being the same. The selection of the molar ratio solvent/dichlorobenzenes results then from a compromise. In general, it can be said that this ratio will be between 0.2 and 5, preferably near 1.

The extractive distillation can be carried out under atmospheric pressure, if the temperature then necessary to cause boiling of the solvent does not cause its degradation. The aprotic polar solvents now industrially utilizable being relatively sensitive to temperature, the distillation is generally carried out under a reduced pressure. Moreover, the coefficient of relative volatility of the mixture meta- para- decreases when the pressure increases, which reduces the efficiency of the distillation. For these two reasons, the pressure at the bottom of the column is generally below 120 mm of mercury.

The selection of the type of column used to carry out the invention is determined by two converging conditions. On the one hand, the column must be able to work under a low pressure; on the other hand, it must include a large number of theoretical plates on account of the low value of the coefficient of relative volatility. The low pressure and the large number of theoretical plates lead to the selection of columns having a packing which shows a low pressure drop. Among the columns which possess these qualities, the columns having a knitted packing and the columns having a wire gauze packing with a geometrical structure are essentially known. All the other characteristics of the column, such as the dimensions and the reflux ratio, are easily determined by the man skilled in the art.

The second step of the process, which consists in separating the extracting solvent from the paradichlorobenzene, and possibly from the orthodichlorobenzene, is a classical operation of distillation, easily realizable on account of the appreciably different physical characteristics of each product present.

The following example shows the efficiency of the extractive distillation according to the process of the invention, when the extracting solvent is hexamethylphosphorotriamide (HMPT).

EXAMPLE

A distillation column 1, which is 20 m. high and 600 mm. in diameter is packed with a geometrical structure wire gauze, having the following characteristics:

| | |
|---|---|
| specific surface area: | 0.5 m²/liter |
| height equivalent of the theoretical plate: | 200 mm. |
| pressure drip for one theoretical plate: | 0.4 mm. Hg. |

This column is fed at the rate of 70 kg/hour by the pipe 2 with a mixture of meta- and para-dichlorobenzenes, in equal proportions by weight, and at the rate of 1000 kg/hour by the pipe 3 with HMPT drawn off from the bottom of column 7 or pumped out in the tank 4 and heated in exchanger 10. The pressure at the top being established at 40 mm Hg, the temperature at this point is 83°C., when at the bottom the pressure is 75 mm Hg and the temperature is 150°C. The meta-dichlorobenzene is drawn off by the pipe 5 (purity 99%) and recycled with a reflux ratio of 18. Under these conditions, the average molar ratio solvent/dichlorobenzene in the liquid phase in the column is near 1.5. The mixture paradichlorobenzene - HMPT is drawn off from the bottom of the column, and then injected in the column 7 (4 m. high, 300 mm. in diameter, the same packing as 1). The pressure at the top of this column being fixed at 40 mm. Hg, the temperature there is 84°C., when at the bottom of the column the pressure is 47 mm. Hg. and the temperature 151°C. The paradichlorobenzene is removed by the pipe 8 (purity 95%), and recycled with a reflux ratio of 4. HMPT drawn off the bottom of column 7 thru pipe 9 is recycled to the column 1.

It will be obvious to those skilled in the art that various changes may be made without departing from the scope of the invention and the invention is not to be considered limited to what is shown in the drawing and described in the specification.

What is claimed is:

1. A process for separating paradichlorobenzene from metadichlorobenzene starting with a mixture of chlorinated benzenes including predominantly said paradichlorobenzene and metadichlorobenzene, comprising:

isolating metadichlorobenzene from said mixture by extractive distillation carried out by dissolving said mixture in at least one aprotic polar organic solvent selected from the group consisting of solvents having both a dielectric constant higher than 20 and a dipolar moment higher than 3.0 Debye, and withdrawing metadichlorobenzene as the distillate and paradichlorobenzene with said aprotic polar organic solvent as the bottoms; and separating the paradichlorobenzene from said aprotic polar organic solvent by distillation, said paradichlorobenzene being withdrawn as distillate and said aprotic polar organic solvent being withdrawn as bottoms.

2. A process according to claim 1, wherein the extractive distillation is carried out under a pressure lower than 120 mm Hg.

3. A process according to claim 1, wherein the aprotic polar solvent is selected from the group consisting of hexamethylphosphorotriamide, dimethylsulfoxide, dibutylsulfoxide and N-methylpyrrolidone.

4. A process according to claim 2, wherein the aprotic polar solvent is selected from the group consisting of hexamethylphosphorotriamide, dimethylsulfoxide, dibutylsulfoxide and N-methylpyrrolidone.

5. A process according to claim 1, wherein the initial mixture further contains orthodichlorobenzene.

6. A process according to claim 2, wherein the initial mixture further contains orthodichlorobenzene.

7. A process according to claim 4, wherein the initial mixture further contains orthodichlorobenzene.

8. A process in accordance with claim 1 wherein the molar ratio of said aprotic polar organic solvent to the dichlorobenzene is 0.2 : 5.

* * * * *